Jan. 16, 1968 G. R. UEBEL ET AL 3,363,498

RECORDER FLUTE

Filed Aug. 24, 1966

PRIOR ART

INVENTORS
GERHARD RUDOLF UEBEL
PETER RUDOLF UEBEL
BY

ATTORNEYS 3,363,498
RECORDER FLUTE
Gerhard Rudolf Uebel and Peter Rudolf Uebel, both of Wohlhausen, Vogtland, Germany
Filed Aug. 24, 1966, Ser. No. 574,722
3 Claims. (Cl. 84—384)

ABSTRACT OF THE DISCLOSURE

An improved recorder flute with novel spacing of the holes for greater ease of playing the same.

In conventional recorder flutes, the finger holes on the upper and lower sides of the instrument are relatively so disposed and their diameters so chosen that when the notes "B" and "C" in the C-major scale are consecutively played, fingering calls for a transposition of the forefinger and middle finger. The fingers must likewise be changed over when the notes "E" to "F" are played. For sounding the "C-sharp," the left forefinger hole and the left middle finger hole must be covered and the thumb hole opened. Therefore this note is difficult to finger and considerable practice is needed to master it in rapid runs. For sounding the higher octave, it was hitherto necessary partly to cover the thumb hole. Considerable dexterity and skill as well as a good ear are required even of a practised player to master this easily.

It is an object of the present invention to facilitate the playing of recorder flutes particularly for children and beginners, by permitting the C-major scale to be played by lifting the fingers consecutively and by making the fingering for sounding the "C-sharp" and the higher octave more easy.

This and other objects and advantages of the invention will become obvious from the following detailed description.

Accordingly, the solution of the problem contemplated is that of changing the relative spacing of the holes as well as the diameters of the holes.

The present invention solves this problem by shifting the thumb hole out of alignment with the forefinger hole and towards the mouthpiece, and by reducing its diameter for the "C-sharp" to be intoned when the forefinger hole is covered and all the other holes opened. The displacement of the thumb hole in a flute-in-C is about 15 mm. and varies in differently pitched instruments of this family of flutes. Furthermore, the diameter of the forefinger hole is so reduced that when all holes are opened except the thumb hole, the instrument plays the note "E."

More particularly, the invention proposes to dispose the forefinger hole with respect to its distance from the other finger holes and to give this hole a diameter in relation to the axial bore of the flute (mensuration), so that when it is opened the first octave sounds. The proposed construction of a recorder flute facilitates the instrument being played by children and beginners and it also makes the change-over to playing other woodwind instruments, such as Boehm clarinettes, far more easy. The "C-sharp" is played simply by opening the thumb hole and closing the left forefinger hole, whereas the upper octave is sounded simply by lifting the left forefinger.

According to the present invention, a recorder is provided comprising a mouthpiece and tube, the tube being provided with eight apertures, seven of said apertures being spaced along the upper side of said tube, and one aperture being provided in the lower side of the tube, said one aperture being a thumb hole, said thumb hole being in closer proximity to the mouthpiece than the first of the upper apertures, said first upper aperture being a forefinger hole, the diameter of the said thumb hole being such that when the said forefinger hole is closed and all other apertures are open, the note "C-sharp" can be intoned.

By the provision of a thumb holder in a flute according to the invention, the flute can be held between the mouth and the right thumb when the "C" and the "C-sharp" in the first octave are played (i.e., the unstopped notes "C" and "C-sharp").

Referring now to the drawings.

Figure 1:
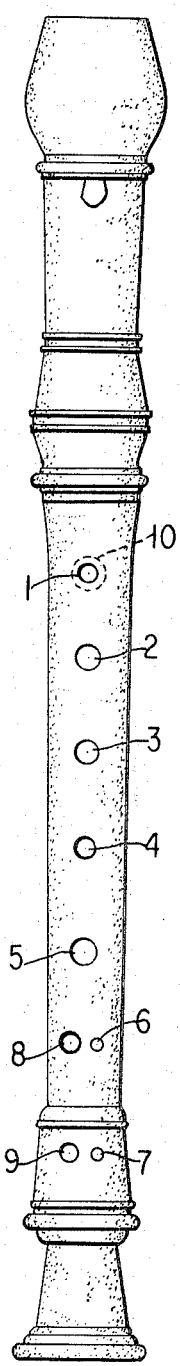
FIG. 1 is a plan view of a conventional flute of the prior art.

In FIGURE 1, the finger holes on the upper side are consecutively numbered 1 to 9. The holes 6 and 8 as well as 7 and 9 are paired side by side. The thumb hole 10, (indicated as a dotted circle), is on the lower side of the flute and axially aligns with the forefinger hole 1.

Figure 2:
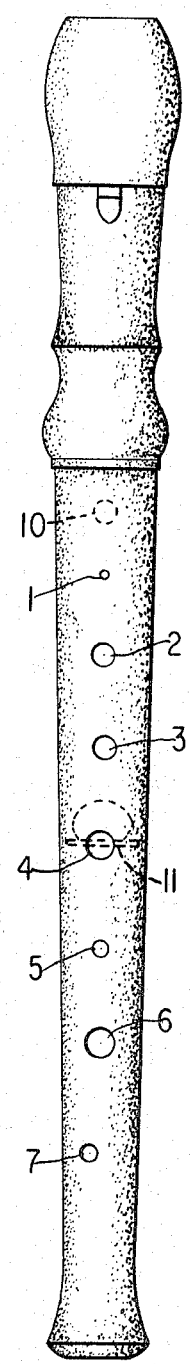
FIG. 2 is a plan view of a flute according to the present invention.

In FIGURE 2, the finger holes on the upper side are correspondingly numbered. Holes 8 and 9 alongside the holes 6 and 7 are absent. The thumb hole 10 on the lower side, (FIG. 2), is shifted towards the mouthpiece with respect to the forefinger hole by about 15 mm.

The diameters of the finger holes 1, 5, 10 in FIG. 2 are substantially smaller than the corresponding holes in FIG. 1. The finger hole 4 in FIG. 2 is larger than the corresponding hole 4 in the flute in FIG. 1. The thumb holder 11 is fitted approximately diametrically opposite the finger hole 4.

For playing the "C-major" scale, all the finger holes are first covered and then opened consecutively. For playing "C-sharp," the thumb hole 10 is opened and the forefinger hole 1 is closed. For playing "C" (all finger holes open), the flute is held at the mouthpiece end by the mouth and otherwise only by the right hand thumb in the thumb holder 11 pushing the flute towards the mouth.

Various modifications of the flute of the invention may be made without departing from the spirit or scope thereof, and it is to be understood that the invention is to be limited only as defined in the appended claims.

We claim:

1. A recorder flute comprising a mouthpiece and tube, the tube being provided with eight apertures, seven of said apertures being spaced along the upper side of said tube and one aperture being provided in the lower side of the tube, said one aperture being a thumb hole, said thumb hole being about 15 mm. closer to the mouthpiece than the first of the upper apertures, said first upper aperture being a forefinger hole, the diameter of the said thumb hole being such that when the said forefinger hole is closed and all other apertures are open, the note of "C-sharp" can be intoned.

2. A recorder flute of claim 1, wherein the diameter of the said forefinger hole is such that when all apertures are closed with the exception of the said thumb hole, the note of "C" can be intoned.

3. A recorder flute of claim 1, wherein the said forefinger hole is so spaced with respect to the other apertures in the upper side of the tube and its diameter in relation to the axial bore of the tube so chosen that the first octave can be intoned when said forefinger hole is open.

References Cited

UNITED STATES PATENTS 2,847,892   8/1958   Laas et al. _ _ _ _ _ _ _ _ _ _ _ 84—380

FOREIGN PATENTS 582,347   11/1946   Great Britain.

RICHARD B. WILKINSON, *Primary Examiner.*

CHARLES OVERBEY, *Assistant Examiner.*